US012002214B1

(12) United States Patent
Chand

(10) Patent No.: US 12,002,214 B1
(45) Date of Patent: Jun. 4, 2024

(54) SYSTEM AND METHOD FOR OBJECT PROCESSING WITH MULTIPLE CAMERA VIDEO DATA USING EPIPOLAR-LINES

(71) Applicant: MOVRS, Inc., Encino, CA (US)

(72) Inventor: Abdullah Chand, Islamabad (PK)

(73) Assignee: MOVRS, Inc., Encino, CA (US)

( * ) Notice: Subject to any disclaimer, the term of this patent is extended or adjusted under 35 U.S.C. 154(b) by 0 days.

(21) Appl. No.: 18/217,799

(22) Filed: Jul. 3, 2023

(51) Int. Cl.
*G06T 7/11* (2017.01)
*G06T 7/215* (2017.01)
*G06T 7/73* (2017.01)
*H04N 7/18* (2006.01)

(52) U.S. Cl.
CPC ................ *G06T 7/11* (2017.01); *G06T 7/215* (2017.01); *G06T 7/73* (2017.01); *H04N 7/181* (2013.01); *G06T 2207/10016* (2013.01); *G06T 2207/20084* (2013.01); *G06T 2207/20132* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 11,361,548 B2* | 6/2022 | Sharma | ................ | G06V 10/255 |
| 11,790,626 B2* | 10/2023 | Xi | ........................ | G06V 10/145 |
| | | | | 382/195 |
| 2020/0098118 A1* | 3/2020 | Namiki | ..................... | G06T 7/97 |
| 2021/0112238 A1* | 4/2021 | Bylicka | ................... | G06T 7/292 |
| 2021/0124933 A1* | 4/2021 | Sharma | ................... | G06T 7/285 |
| 2021/0241022 A1* | 8/2021 | Lee | .......................... | G06V 10/82 |
| 2021/0365707 A1* | 11/2021 | Mao | ....................... | G06V 20/46 |
| 2022/0335733 A1* | 10/2022 | Leach | .................... | G06V 20/64 |
| 2023/0137337 A1* | 5/2023 | Maji | ...................... | G06V 10/82 |
| | | | | 382/100 |
| 2023/0317212 A1* | 10/2023 | Powers | .................. | G16C 10/00 |
| | | | | 703/12 |

FOREIGN PATENT DOCUMENTS

CN 110796699 A * 2/2020

* cited by examiner

*Primary Examiner* — Delomia L Gilliard
(74) *Attorney, Agent, or Firm* — Staniford Tomita LLP

(57) ABSTRACT

A system and method for processing video data of an object in a movement space comprises uses a plurality of cameras each facing the movement space. An object detection engine running on a processor is in communication with each of the plurality of cameras that transmit video data of the movement space to the processor. The object detection engine determines the coordinates of a bounding box that closely surrounds the object in a frame of the video data from a master camera. The processor then determines, epipolar lines corresponding to points on the bounding box in the frame of the master camera in each of the frames of the video data from the non-master cameras. The processor crops the video data in the frame of the non-master cameras outside two of the epipolar lines to reduce and improve the video data processing.

20 Claims, 9 Drawing Sheets

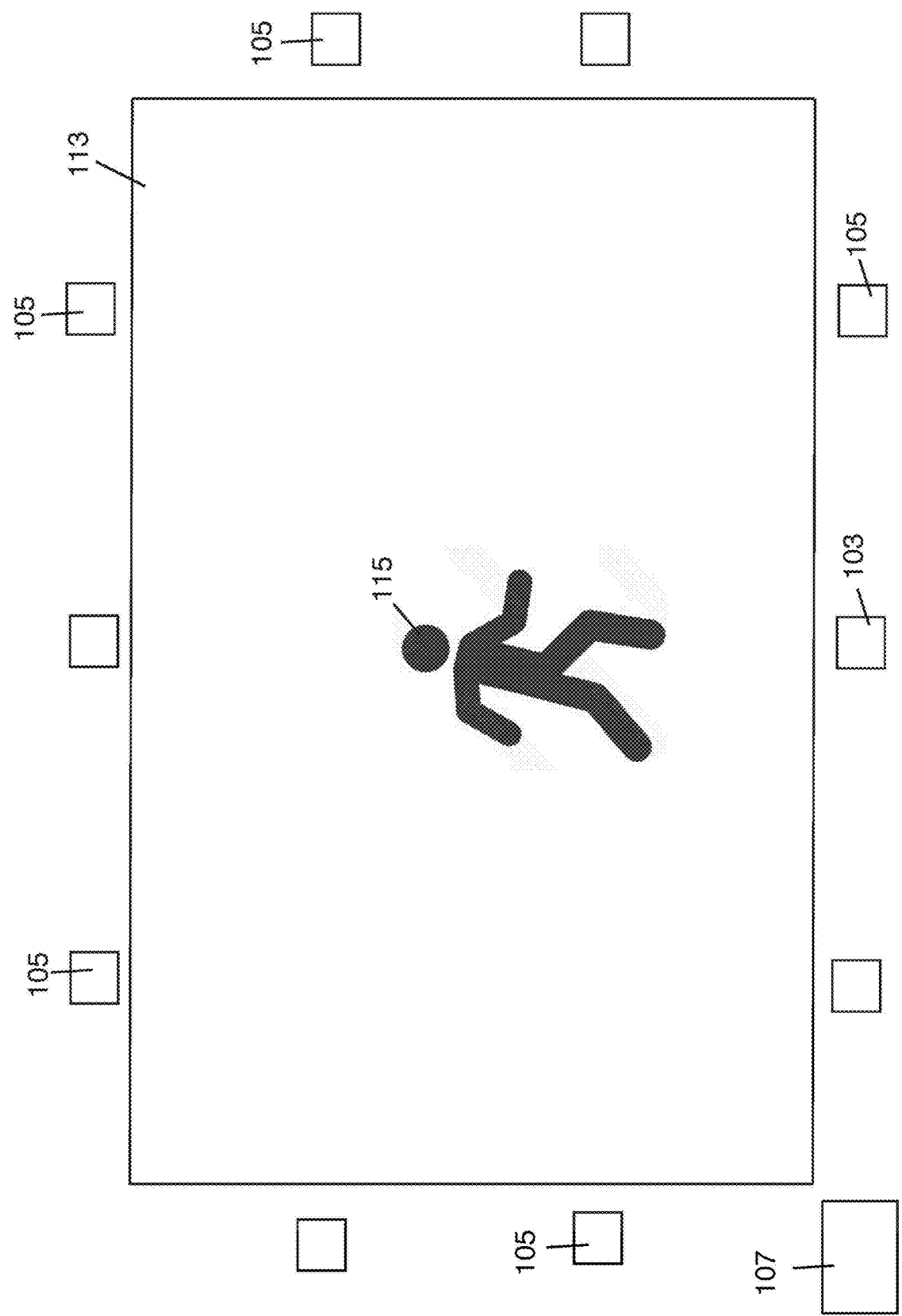

SYSTEM AND METHOD FOR OBJECT PROCESSING WITH MULTIPLE CAMERA VIDEO DATA USING EPIPOLAR-LINES

BACKGROUND

Moving objects such as people and athletes are frequently recorded with multi-camera video camera systems for human pose estimation. AI based object detection systems can be used to identify that a person is in a frame of video data, and a bounding box can be generated by the object detection system. Typically, such a bounding box is rectangular and closely bounds the image of the person.

The bounding boxes can be used to crop the video data to just the data near the person. This cropping reduces the amount of data that needs to be processed subsequently, such as by an AI based pose-estimation system. However, the use of AI based object detection systems by all cameras in a multi-camera can be slow and requires a large amount of processing power. What is desired is an improved system that can closely crop the video data around a person more quickly.

What is needed is a system that also has applications in multi-camera systems for objects other than persons and for systems on moving platforms (like a car or plane), wherein the recorded objects or persons can be moving and/or stationary. Further, the needed system may include non-video cameras and object detection systems and pose-estimation systems that are not AI based that can benefit from the faster processing that the present invention can provide.

BRIEF SUMMARY OF THE INVENTION

The system also has applications in multi-camera systems for objects other than persons and for systems on moving platforms (like a car or plane), wherein the recorded objects or persons can be moving and/or stationary. Further, non-video cameras may also be used and object detection systems and pose-estimation systems that are not AI based can be benefit from the faster processing that the present invention can provide.

Testing has shown that the processing of the video data using the inventive processing methods can be performed much more quickly than known processing methods. For example, the inventive system can process video data for an object in a movement space from eight video cameras in 7 milliseconds per image frame while currently known processing processes can require 22 milliseconds per image frame. Normal video data can be recorded and played back at a range of 30 to 60 frames per second (FPS) which is 66.666 to 33.333 milliseconds per video frame. Because the inventive system can process video data so quickly, the conversion from video data to processed data can occur before the subsequent image frame of video is recorded.

The inventive process can be performed for each frame of the video data of the object from a number of the cameras recording the object in the movement space that can communicate with one or more computing devices for processing the video data received from the cameras. The system can be very flexible and can function with any number and/or type of cameras. In some embodiments, the system can use several cameras positioned around a sports area such as a field, track, court, ring, or other movement space. The cameras can have field of views that cover all or a portion of the movement space. The cameras can be fixed in position or they may be mounted on moving platforms such as a car, plane, moving cart, cable system, etc. The cameras can be professional grade, high frame rate and high resolution devices or consumer grade products such as consumer cameras, non-video cameras, smartphone cameras, object detection systems, pose estimation systems, and other non-artificial intelligence (AI) systems that can benefit from faster processing than existing systems can provide.

The system can include an AI based object detection engine that can identify an object such as a person, a ball, a car, etc. More specifically, this engine can be trained to identify people. The object detection engine can also provide a confidence score that indicates the likelihood that it has identified a person in the frame, and a class identifier, i.e. "1=person." In a preferred embodiment, a threshold of 80% is used to determine if a person has been located. If an object does not meet this threshold, the data from the camera for that frame is not processed. Alternatively, other thresholds can be used. Further, the object detection engine can also locate the object in the image with a bounding box for any of the cameras for further processing. In the preferred embodiment, a pretrained YOLO v5 object detection engine has been used as the object detection engine. Other engines could be used including other pretrained engines or other engines that can be trained for specific applications.

Once a moving object or person has been detected and located in the image frames of the cameras in the system, the pose estimation AI engine can be used to locate the keypoints (i.e. head, knee, or elbow) of the person in frames of each of the cameras. The pose estimation AI engine can also return a confidence score for each of the keypoints. For example, if one of the keypoints, (such as a knee or hand), is occluded, the confidence score for that keypoint would be a zero or a low value. If a keypoint, such as a head, was easily identified, the confidence score would be high. The preferred embodiment uses the 17 Common Objects in Context (COCO) keypoints and the official PyTorch implementation of Simple Baselines for Human Pose Estimation and Tracking is used as the pose-estimation AI engine. Other engines and keypoints definitions can be used. For example, a person or other object can have a different number of keypoints.

The computer system can also determine which camera to designate as the master camera. This can be done by using the confidence scores returned by the pose estimation engine. In the preferred embodiment, a short list of cameras is prepared that have at least a 70% confidence value for the head, knees, and all points below the knees. This assures that the cameras on the short list have a good view of the person. Then, an average confidence value from all 17 keypoints is determined for each camera on the short list and the camera with the highest average is designated the "Master Camera." Alternatively, other methods for determining the master camera can be used. In the preferred embodiment a new master camera can be determined for each frame of the video data.

The points on the bounding box of the master camera represent lines that project into the three dimensional movement space from the lens of the master camera. The computer system can calculate epipolar lines in the video data image frames of non-master cameras representing these lines in the movement space. For example, if the bounding box is a rectangle, the system can generate epipolar lines on the video data image frames of non-master cameras corresponding to the lines in the movement space that the four corners of the rectangle represent. The object or person of interest will be between two of the epipolar lines in the video data image frame of all of the non-master cameras as described in more detail below.

The system can use the epipolar lines to crop the video data image frames from each of the non-master cameras. Specifically, the portions of the video data image frame above the highest epipolar line and the video data below the lowest epipolar line on each of the frames of each of the other cameras can be cropped and not processed. The processor can then only process the video data between the outermost epipolar lines. The described process can be repeated for each frame of the synchronized video data from all of the video cameras.

The use of epipolar cropping of video data as described substantially reduces the computational load on the system and speeds up the processing so that processing by the inventive system can be performed in real-time or near real-time. The processed object data can have various uses. The system can be used to create athlete specific intellectual property that can be used to analyze and predict the performance of athletes. The digital athlete data recorded over time can also be used to quantify changes in performance. Cumulatively, the digital data can be used to predict the odds of sporting event outputs which can be useful in sports betting applications. The digital athlete data can be used to create hyper realistic animations that can allow visualization of the object movement in a virtual or augmented environment.

BRIEF DESCRIPTION OF THE DRAWINGS

FIG. 1 illustrates an object in a movement space with a plurality of video cameras facing the object movement space.

DETAILED DESCRIPTION

Figure 2A:
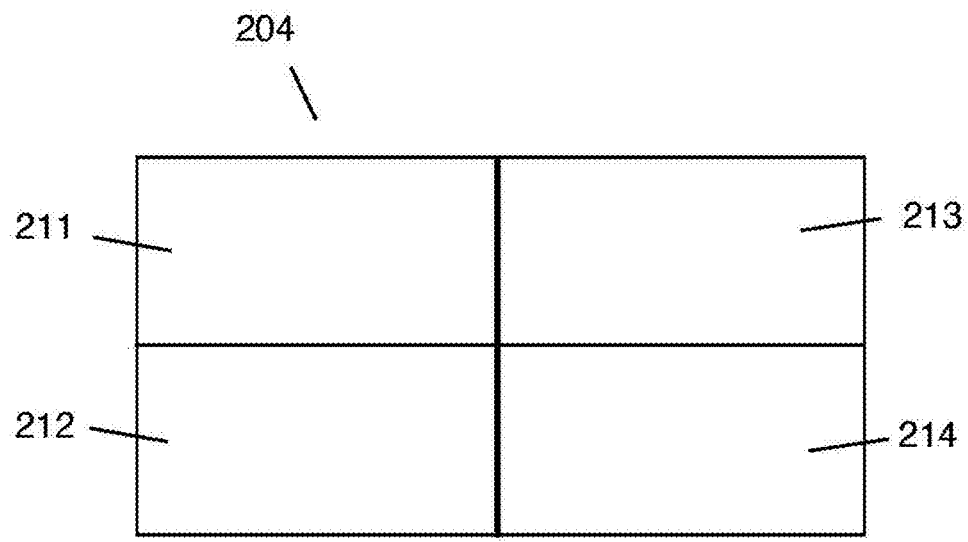
FIGS. 2A and 2B illustrate embodiments of arrays of cameras.

FIG. 1. Illustrates an embodiment of a multi-camera object processing system that is used to process an object 115 in a movement space 113. Video cameras 103, 105 are placed around the perimeter of the movement space 113 to record video data of the object 105 in the movement space. The video cameras 103, 105 can face the movement space 113 and the video data from the cameras 103, 105 can be transmitted to a computer system 107. The video data from the cameras 103, 105 can be synchronized so that each video image frame of each of the cameras 103, 105 is taken at the exact same time and the object 115 will be in the same position and location in the movement space 113. Because each camera 103, 105 can be at a different position around the movement space, each camera 103, 105 will have a different perspective view of the object 115 in a movement space 113.

In alternative embodiments, the data from non-synchronized cameras can be synchronized before processing. Non-synchronized cameras can include smartphone cameras and cameras mounted on moving platforms such as a car, plane, moving cart, cable system, etc. It can be important for the computing system to know the locations and orientations of the non-synchronized cameras. Non-video cameras, such as neuromorphic cameras that can have a silicon retina or dynamic vision sensor that can respond to local changes in brightness could be used with the system. The (x, y, z) location, orientation, and field of view data can be provided by each of the cameras and/or position/orientation measurement mechanisms. Alternatively, the camera location, orientation data, and a precise time can be determined by the camera and/or any location position mechanism including: GPS, position measurement/detection systems, etc. The location, orientation, and field of view data, as well as time data for each video data image, can be transmitted to the computing system(s) so that the 2D video data from these cameras can be synchronized and integrated into the data that is processed by the AI system and used to create 3D real time object movement data.

The inventive system can be set up with a calibration process that can be used to characterize the view of each camera's 103, 105 of the three-dimensional movement space 113. The calibration can allow mapping from the three-dimensional world field of view (FOV) frame of the movement space 113 to precise image coordinates of each of the cameras 103, 105 in the system. Generally, the calibration process can include intrinsic parameter calibration factors such as the focal length, aperture, field-of-view, resolution, etc. for each of the cameras 103, 105. Extrinsic parameters, such as rotation and translation can define the location and orientation of the cameras 103, 105 with respect to the world FOV frame of the movement space 113. The calibration procedure can consist of using known geometric information (e.g., scale bars or patterns) to estimate the transformation in terms of position and orientation (extrinsic parameters) between the cameras. These are well-known as photogrammetric adjustment or bundle adjustment algorithms can also be used by the system. After calibration, the cameras 103, 105 are characterized such that each point on each frame image of the video data for each camera 103, 105 can be accurately mapped onto the 3-dimensional object movement space 113.

Each of the camera 103, 105 locations can be a single video camera or an array of multiple cameras with each camera in the array focused on a specific portion of the movement space 113 that can be a sports activity area. In some embodiments, the cameras 103, 105 can be located around the periphery of or over the movement space 113. Some of the cameras 103, 105 can be located at the ground level and some of the cameras 103, 105 can be located at elevated positions so that the cameras 103, 105 can be angled downward towards a movement space 113 field. In some embodiments, it may be possible for some of the cameras 103, 105 to be located in the movement space 113 or be moving while recording the video data.

The number of cameras at each of the camera 103, 105 locations can be proportional to the size of the movement space 113 which can be over a sports activity area such as a field or a court. A small movement space 113 may only require a single camera at each of the camera 103, 105 locations while larger movement spaces 113 can require many more cameras to provide adequate images for accurate digitization of a moving object 115. In these embodiments, multiple cameras mounted in multiple arrays positioned at locations around the periphery of and/or above the movement space 113. Each of the cameras 103, 105 in each array can have a field of view of a portion of the movement space 113 with each of the camera 103, 105 having a view (FOV) of a different portion of the movement space 113. In other embodiments, each camera can have a unique location around the periphery of the movement space 113 with a field of view covering some or all of the movement space 113.

The number of cameras used or needed by the system can be directly proportional to the size of the movement space 113. Table 2 lists the field sizes of various sports, the sizes of the venues, and the cameras/array for proper video resolution.

TABLE 1

| Sport | Length (feet) | Width (feet) | Area (square feet) | Cameras/Array |
|---|---|---|---|---|
| Boxing | 24 | 24 | 576 | 1-4 |
| Volleyball | 59 | 30 | 1,770 | 1-8 |
| Tennis | 78 | 36 | 2,808 | 2-10 |
| Basketball | 94 | 50 | 4,700 | 4-16 |
| Hockey | 200 | 85 | 17,000 | 8-20 |
| Football | 420 | 160 | 67,200 | 8-40 |
| Soccer | 360 | 240 | 86,400 | 8-50 |
| Baseball | 320 | 320 | 102,400 | 8-60 |

Figure 2B:
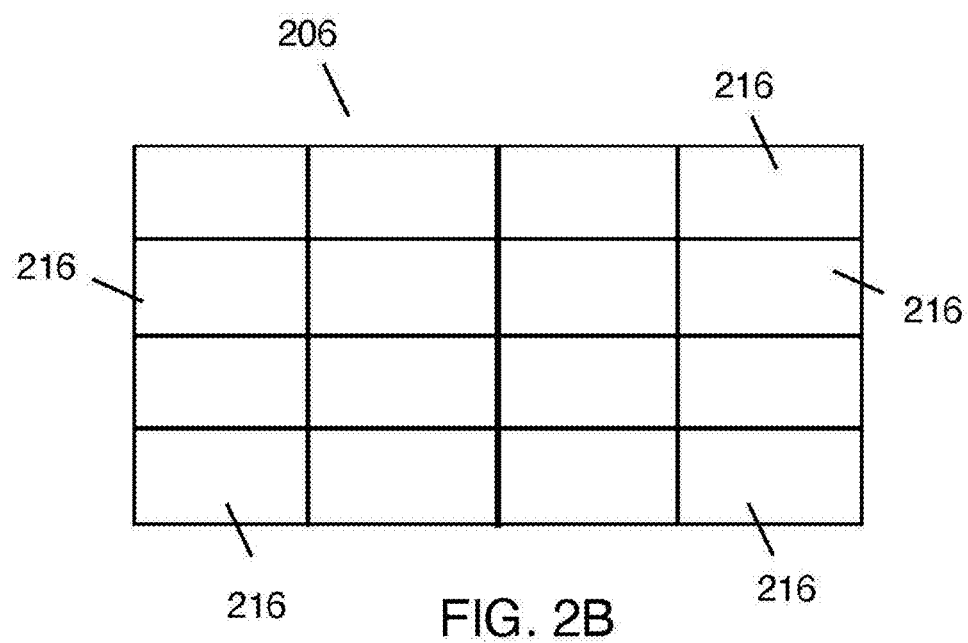

FIGS. 2A and 2B illustrate examples of camera arrays. FIG. 2A illustrates a four camera array 204 which can have four cameras 205 with each camera in the array having a field of view covering a different portion of a movement space. For example, if the movement space is over a tennis court, camera arrays 204 can be mounted around the tennis court and each camera 211, 212, 213, 214 can have a field of view covering a different portion of the court. For example, the first camera 211 can be directed towards an area between the service line and beyond the baseline portion of a first side of the court and a second camera 212 can be directed towards an area between the service line and the net of the first side of the court. A third camera 213 can be directed towards an area between the service line and the net of a second side of the court and A fourth camera 214 can be directed towards an area between the service line and beyond the baseline portion of the second side of the court. For larger sized movement spaces, larger arrays of cameras may be necessary. FIG. 2B illustrates a camera array 206 that has 16 cameras 216 that can be used for larger movement spaces such as a hockey rink.

In some embodiments, the system can be calibrated to characterize the views of each camera surrounding a 3-dimensional object movement space as described above. Using the calibrated geometry of the cameras, epipolar lines representing the corners of the Master Camera bounding box can be calculated for each of the image frames for the non-master cameras. As discussed above, some of the cameras can be mounted on moving platforms such as: car, plane, helicopter, moving cart, cable system, or phone cameras that are operated by moving operators. Because the cameras can be moving, these cameras can be calibrated for each known or detected camera position using the position, orientation, and field of view information for the moving cameras.

Figure 3:
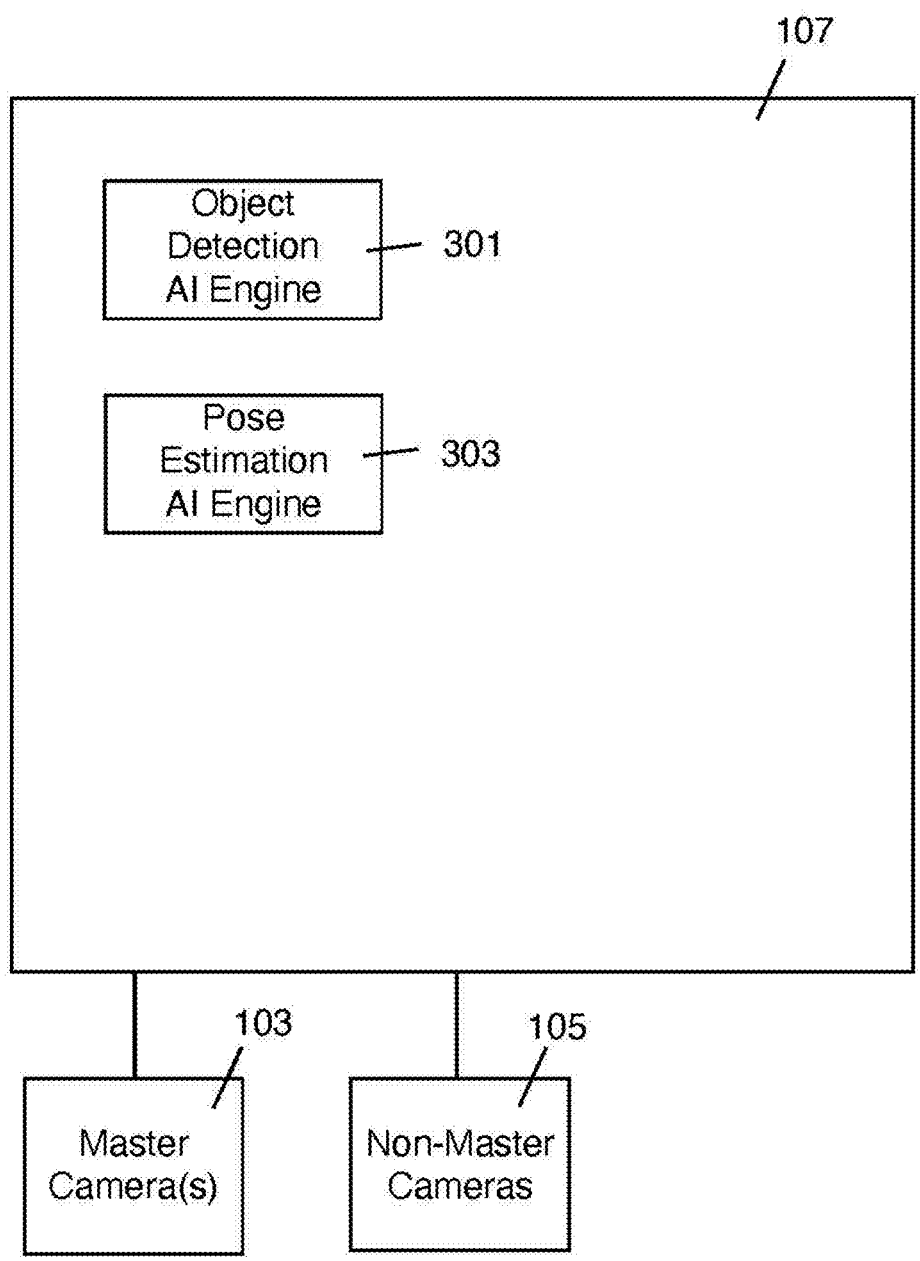
FIG. 3 illustrates a block diagram of a processor with AI engines coupled to cameras.

In the present multi-camera system, artificial intelligence (AI) engines running on the computing device can trained to perform several of the required processes for processing the object video data from the cameras recording the object. With reference to FIG. 3, the computer system 107 can have artificial intelligence (AI) engines for performing specialized processing that can require a high quantity of computer processing power. In the illustrated embodiment, the computer system 107 can have an object detection AI engine 301 and a pose estimation AI engine 303 that each run on the processor of the computer system 107. The object detection engine 401 can receive video data from the cameras 103, 105 and determine if an object such as a moving person is in the movement space. If an object is not detected, the cameras 103, 105 can continue to transmit video data of the object movement space until an object is detected by the object detection AI engine 401.

When an object is detected in the movement space, a pose estimation AI engine 403 running on the computer system 107 can be used to locate keypoints of the object. The pose estimation AI engine 403 can determine the locations of the keypoints on the frames of cameras 103, 105 and can determine a confidence score for each of keypoints on each of the cameras 103, 105 for each frame of video data.

Figure 4:
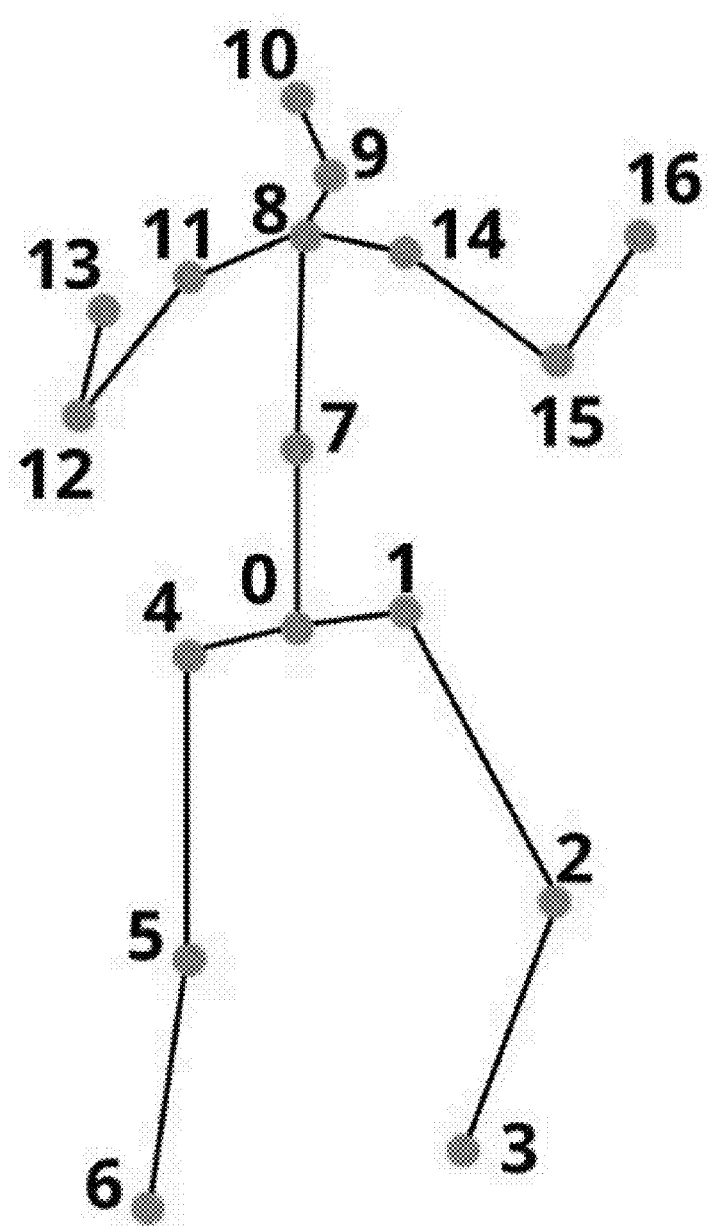
FIG. 4 illustrates a stick person with keypoints.

With reference to FIG. 4 a view of a stick person 201 animation is illustrated. The stick person 201 has seventeen keypoints which are listed in the table below. The identities of each of the keypoints is listed in Table 1 below. Different cameras will have different views of the object and there can be other objects in the object movement space that can obstruct the view of the object by the cameras. The pose estimation AI engine can attempt to identify the locations of keypoints for the object as specific x and y coordinates in the image frame data from each of the video cameras. Table 2 below lists the names of the 17 keypoints on a human stick figure animation shown in FIG. 2.

TABLE 2

| Number | Identity |
|---|---|
| 0 | Bottom Torso |
| 1 | Left Hip |
| 2 | Left Knee |
| 3 | Left Foot |
| 4 | Right Hip |
| 5 | Right Knee |
| 6 | Right Foot |
| 7 | Center Torso |
| 8 | Upper Torso |
| 9 | Neck Base |
| 10 | Center Head |
| 11 | Right Shoulder |
| 12 | Right Elbow |
| 13 | Right Hand |
| 14 | Left Shoulder |
| 15 | Left Elbow |
| 16 | Left Hand |

The illustrated example determines the master camera based on the confidence scores of the head and the trunk. However, in other embodiments, other methods may be used. For example, other keypoints could be used for persons, and others still for objects such as balls. The decision could be based on weighting the different keypoints, or having a certain number of keypoints with confidence scores over a certain threshold value.

As shown in FIG. 1, the cameras 103, 105 can all having simultaneous views of the object person 115. The object person 115 can be in the field of view of all cameras 103, 105 with each camera 103, 105 having a view of object person 115 from a different perspective. In some embodiments, the video data for each of the cameras 103, 105 can be analyzed by the pose estimation AI engine running on the computer system 107.

Figure 5:
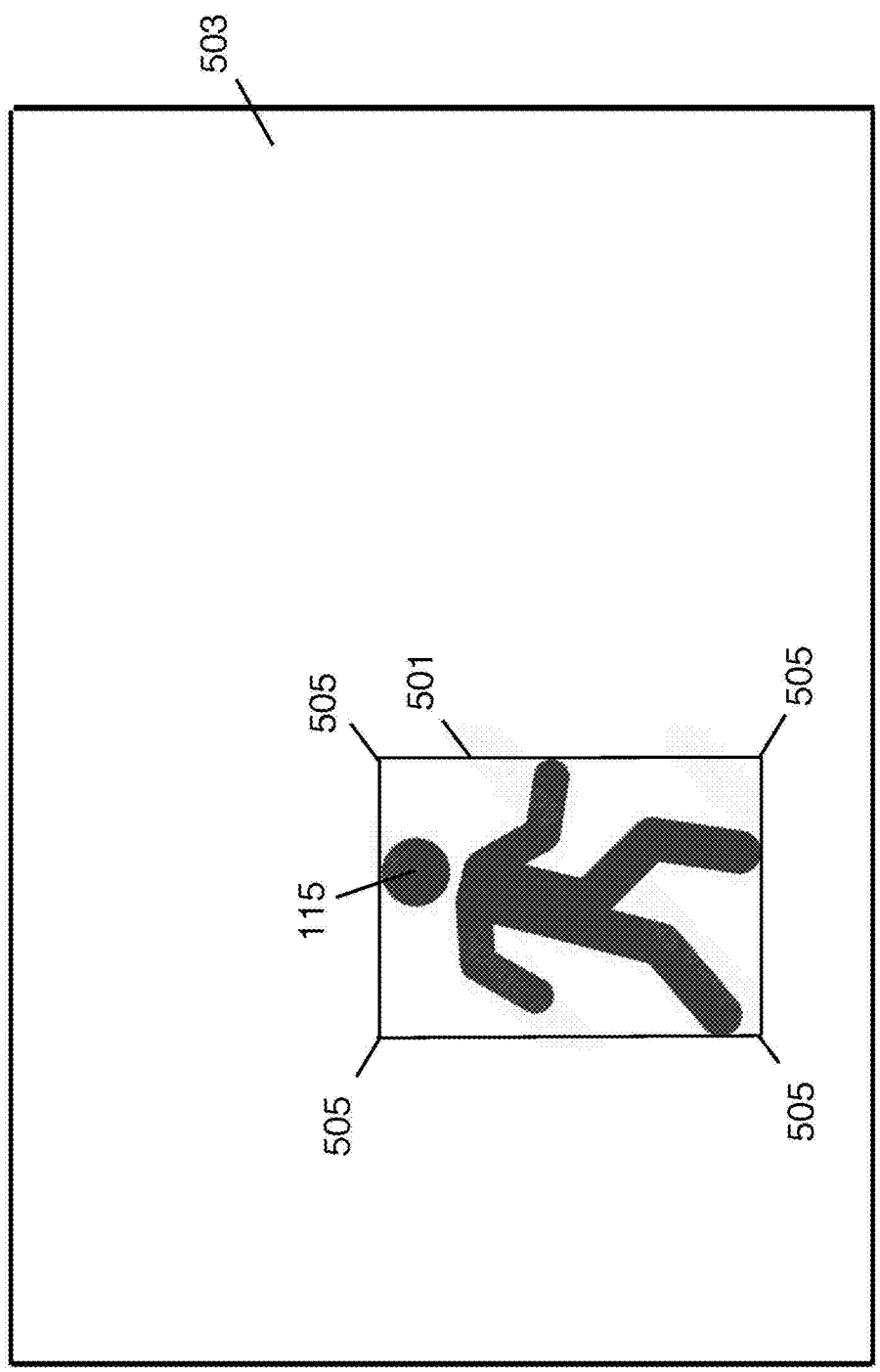
FIG. 5 illustrates a bounding box that closely surrounds an object in an image frame of a master camera.

With reference to FIGS. 3 and 5, the object detection AI engine 301 running on the computer system 107 can then be used to determine a bounding box 501 around the object 115 within the image frame field of view 503 of the master camera video data. In the illustrated example, the object 115 is a person and the bounding box 501 is rectangular in shape with vertical sides and horizontal top and bottom lines. The top line of the bounding box 501 can contact the top of the object person's 115 head and the bottom line of the bounding box 501 can contact the bottom of the object person's 115 left foot. The right line of the bounding box 501 can contact the top of the object person's 115 left hand and the left line of the bounding box 501 can contact the bottom of the object person's 115 right foot.

In other embodiments, the object detected by the cameras in the movement space can be any other object such as a ball. The bounding box used by the system can be appropriate for the object being detected and can be any geometric shape such as a circle. For example, the object can be a ball and the bounding box can be a circle. In these embodiments, the system can project two epipolar lines that extend from the camera through an upper tangent point and a lower tangent point on the circle or oval. The inventive system can process the image data within the bounding box for the master camera while all of the image data outside the bounding box can be cropped and is not processed.

Figure 6:
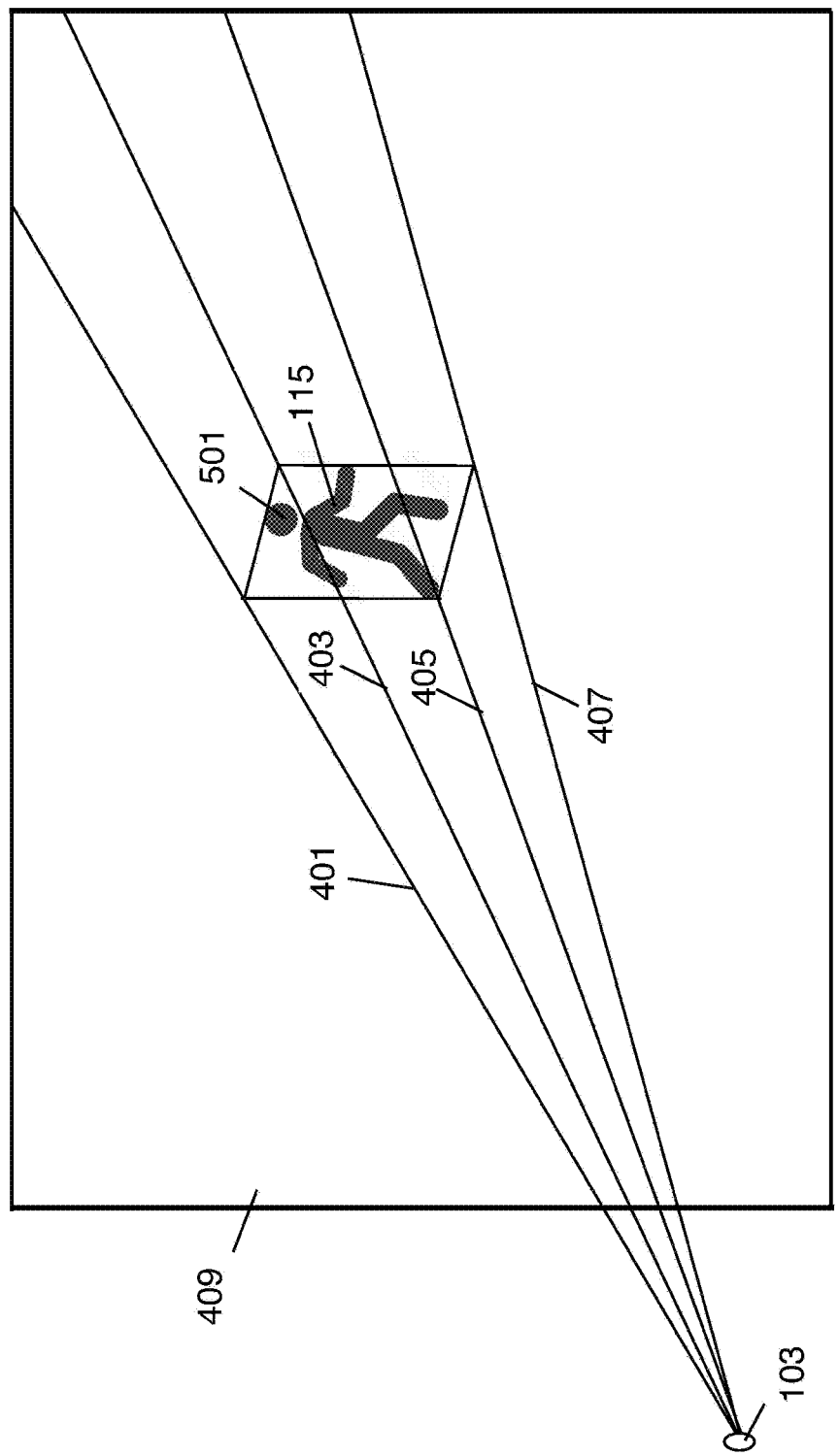
FIG. 6 illustrates a set of epipolar lines on an image frame of a non-master camera.

With reference to FIGS. 6, the computing processor can calculate the epipolar lines corresponding to points of the bounding box 501 on to the image frames of the non-master cameras. The epipolar lines will be the projection of a four sided pyramid having lines that that all originate at the optical center of the master camera and form a rectangle that closely bounds the person.

With reference to FIG. 6, when the object 115 (person) is in an image frame field of view 409 of one of the non-master cameras, the processor can determine the positions of the epipolar lines 401, 403, 405, 407 on the image frames 409 of the non-master cameras. The angled bounding box 501 from the master camera image frame is illustrated to show how the epipolar line 401 extends through the upper left corner of the bounding box 501 of the master camera. Each of the other non-master cameras can have a different perspective of the object 115 in the movement space and the epipolar lines will have different positions on each of the image frames of each of the other non-master cameras.

The two "top" epipolar lines 401 and 403 can correspond to the top-left and top-right corners, respectively, of the Master Camera Bounding Box 501. Since Person 115 is within the rectangular cone defined by corners of the bounding box 501, the person object 115 must be below the highest epipolar lines 401, 403 on the non-master camera frame. In this image frame, the highest epipolar line is epipolar line 401. Similarly, the person 115 is above the lowest epipolar line 407. Subsequent processing only needs to be performed on the portion of the image data between the highest epipolar line 401 and the lowest epipolar line 407 from the bounding box 501 of the Master Camera 101 to find person object 115.

For each of the image frames from the video data from each of the non-master cameras, the computing processor can determine the highest epipolar line 401 and the lowest epipolar line 407. The computing processor can then crop the image data above the highest epipolar line 401 and the lowest epipolar line 407, so that only the image data between the highest epipolar line 401 and the lowest epipolar line 407 is processed. The processing power required for processing the video data can be greatly reduced by cropping.

By reducing the area of image frame being processed, the processing power required can be reduced and the processing speed can be improved. Further, cameras that have no view of the subject as determined by epipolar cropping and supplemental cropping (as described below) need not be processed, further improving the processing speed.

Supplemental cropping can be performed on the video image data from the cameras using processes that do not require AI engines to further improve the processing power required and processing speed. Several supplemental cropping processes are described below that can be used individually or used in combination.

In some embodiments, additional supplemental cropping can be performed to further reduce the amount of image frame data that is processed. The supplemental cropping can be performed before or after the epipolar line cropping described above. Possible supplemental cropping can be performed using one or more of the following processes: background subtraction, feature detection, and multiple master cameras.

Background subtraction can be used to differentiate moving objects of interest in the video data from static objects that are not of interest in video camera image data. Each of the cameras surrounding the object movement space can take a reference frame image that can be referred to as a "background image." The image data from the cameras that matches the static background image can be ignored and not processed so that only the differentiated moving object image data can be processed which can again improve the digital processing speed of the system. The background subtraction technique has limitations when the movement space background is not static and/or when movement space lighting varies. However, in many situations background subtraction can be used to further crop the image and to speed up digital processing.

Another supplemental cropping technique is "feature detection." Feature detection is a low-level image processing technique that can be used to identify certain features of a known object such as a person. The feature detection supplemental cropping can compute the displacement of the known features in subsequent images. Feature detection is a method for computing abstractions of an image of the object and making local decisions at every image point where there is an image feature. For example, if the object in the movement space is a player person on a sports team wearing a team jersey, the feature detection process can be trained and used for the known features of the player. For example, the jersey can have known colors and a corner of the jersey can have a unique corner which is located in two sequential images. The displacement of the player person can be estimated and the cropped area can be similarly displaced to better track a moving person. Simple image features commonly used in feature detection include edges, colors, and objects.

Yet another supplemental cropping technique is to use multiple master cameras which create multiple sets of epipolar lines on the image data from each of the cameras to further crop the portions of the video data from the system cameras. As described above, the Pose Estimation AI Engine determines a first master camera with the highest confidence score which is the camera that can detect the most keypoints. The system can also be configured to determine a second master camera that can have the second highest confidence score using the process described above.

The object detection engine running on the computer system can then be used to determine a second bounding box around the object within the image frame of the second master camera. The image data from the master cameras within the bounding boxes can be processed while all of the image data outside the bounding boxes can be cropped and not processed. The computing processor can calculate the epipolar lines corresponding to points on the second bounding box on the image frame on the second master camera on the image frames of the non-master cameras. In an embodiment, the epipolar lines can correspond to the corners of the second bounding box. The object detection engine can determine the highest epipolar line and the lowest epipolar line for both sets of epipolar lines. The object detection engine can then crop the image data above the highest epipolar line and the lowest epipolar line for each set of epipolar lines. Thus, the system only processes the image data within a polygon formed by the highest epipolar lines and the lowest epipolar lines from both sets of epipolar lines. By further cropping the images of the non-master cameras, the processing speed and efficiency can be greatly improved.

Figure 7:
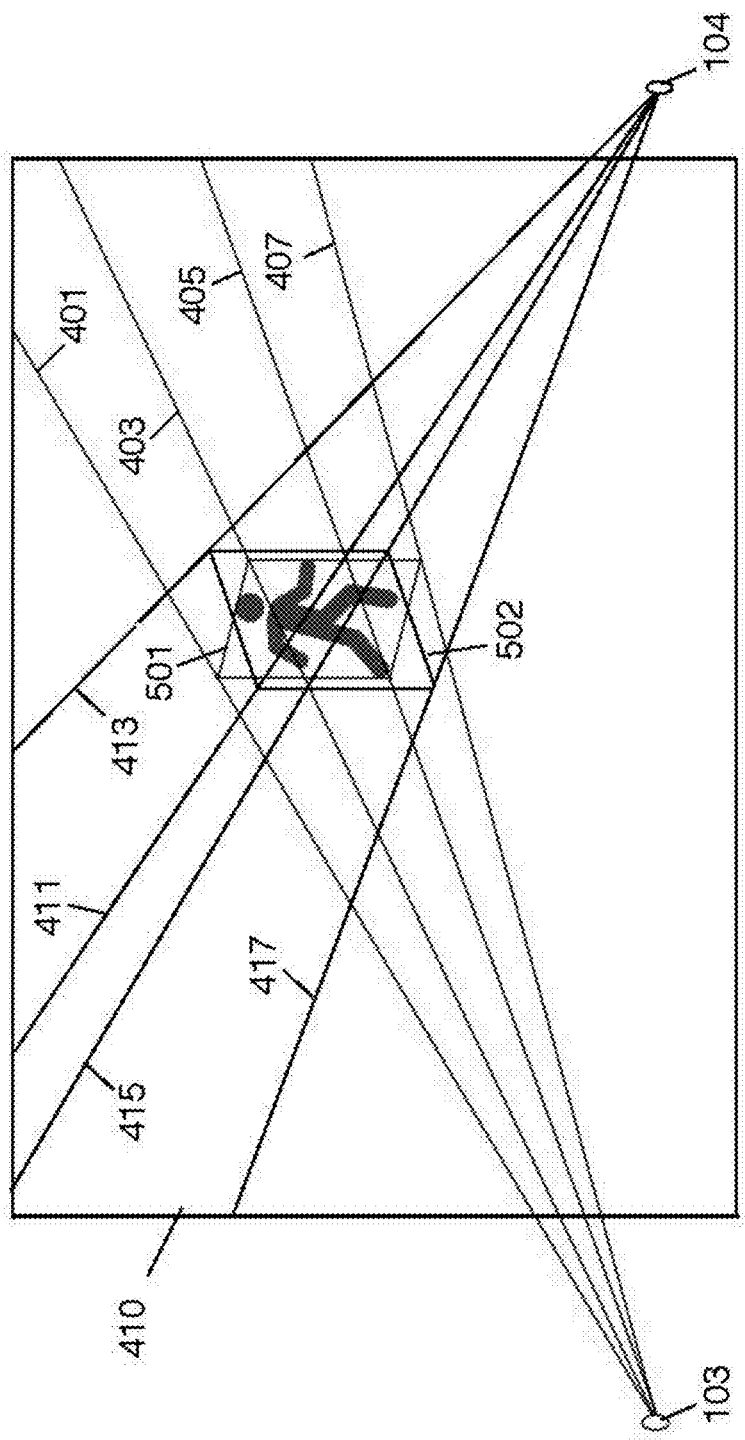
FIG. 7 illustrates two sets of epipolar lines projected onto an image frame of a non-master camera.

FIG. 7 shows a further aspect of the present invention that uses the two sets of epipolar lines. The first set of epipolar lines 401, 403, 405, 407 are lines that correspond to the corners of the first bounding box 501 of first master camera 103. The second set of epipolar lines 411, 413, 415, 417 are epipolar lines that correspond to the corners of the second bounding box of the second master camera. The processor can crop the image data of the non-master camera that is above the upper epipolar line 401 and below the lower epipolar line 407 from the first set of epipolar lines and crop the image data that is above the upper epipolar line 413 and below the lower epipolar line 417 from the second set of epipolar lines. By further cropping the image data before processing, the processing computing power and processing time required by the system processor can be further reduced.

Once the image data for the object in the movement space is processed for a first image frame from each of the cameras, the described process can be repeated for the subsequent image frames. The system can detect an object in the movement space and identifying the master camera for the next image frame from the video cameras and perform the cropping of the master and non-master cameras as described above. The processed data from the video camera footage can then be used for various applications including: object animation, performance analysis, movement tends and statistics.

Figure 8:
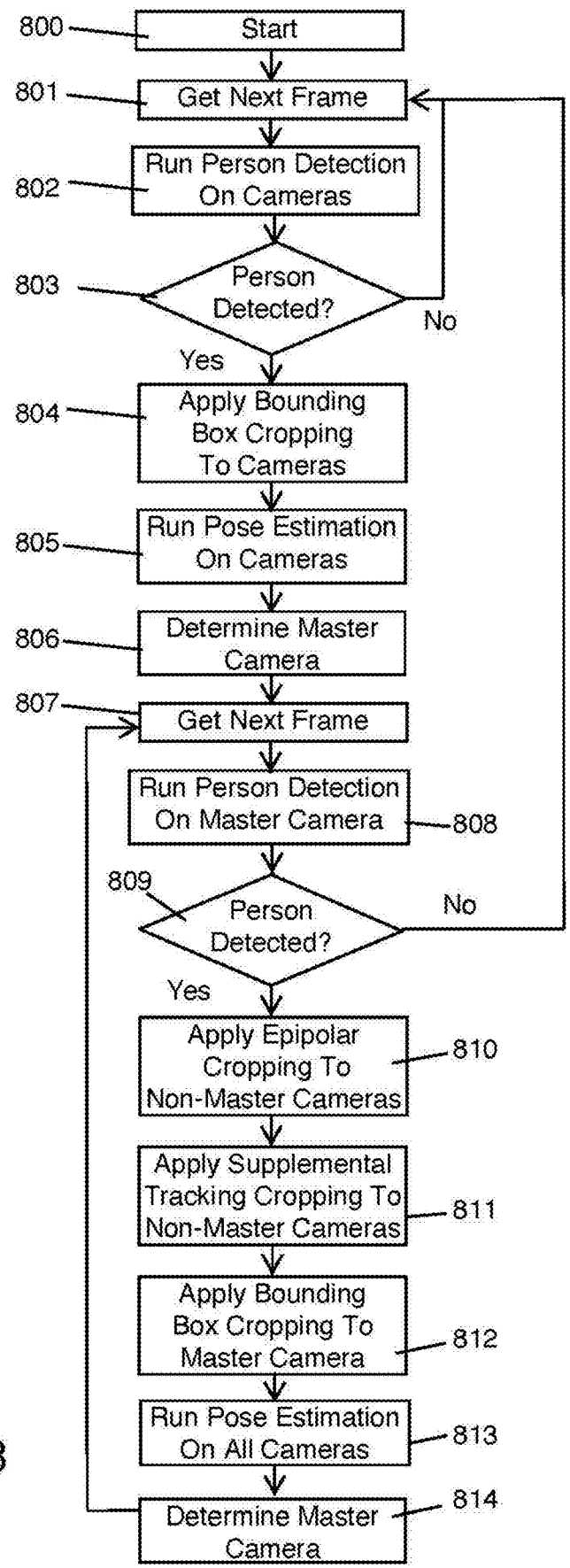
FIG. 8 illustrates an embodiment of a video data processing flowchart.

FIG. 8 illustrates a flowchart for the processes performed by the inventive system for processing movement image data of a person in a movement space. As described above with reference to FIG. 1, the processing system can start 800 and an image frame data from the cameras can be transmitted to the computer system 801. The person detection engine can run person detection on the image frame data from the cameras 802. If a person is not detected in the movement space 803, the video cameras can continue to record and the computer system can receive the next image frame from the cameras 801.

If a person is detected in the movement space 803, the person detection engine can create and apply a bounding box around the person in the video data image frames received from the cameras. The processing system can perform bounding box cropping to the image data from the cameras 804. The cropping can remove image data outside of the bounding boxes for each of the image frames from the cameras. The pose estimation AI engine can run pose estimation on the image frame data from the cameras 805. The pose estimation engine can provide confidence scores for the keypoints of the person for the cameras and the computer system can be used to determine a master camera based on these confidence scores as described above.

The cameras can then transmit the next image frames to the processor 807. The processor can run person detection on the image frame data on the master camera 808 and determine if a person is detected 809. If a person is not detected, the video cameras can continue to record and the computer system can analyze the next image frame from the cameras 801. If a person is detected, the processor can then determine the locations of the epipolar lines on the video data image frames from the non-master cameras 810. The processor can crop the video data image frames from the non-master cameras so that the image data above the top epipolar line and the image data below the bottom epipolar line is cropped from the video data of the non-master cameras. In some embodiments, the epipolar line cropped video data from the non-master cameras can be further cropped with supplemental cropping 811. The further cropped image data can further reduce the processing power required to process the supplementally cropped image data. The processor can apply bounding box cropping to the image data from the master camera 812.

The pose estimation AI engine can be run on the image frame data from the cameras 813. As described above, the pose estimation engine can provide confidence scores for the keypoints of the person for each of the cameras, and the computer system can determine a new master camera by the process described above 814. This master camera may be different than the one determined previously in step 806. The cameras can then transmit the next image frames to the processor 807.

The described process can be repeated continuously for multiple frames of the video data from the cameras. While the described flowchart processes have a specific sequence of process steps, in other embodiments, the steps can occur in a different order. For example, the cropping steps 810, 811, and 812 could occur in a different order.

The person detection engine can create a first bounding box around the object in the video data image frame from the first master camera and a second bounding box around the person in the video data image frame from the second master camera. The processor can then determine the locations of a first set of epipolar lines and a second set of epipolar lines on the video data image frames of the non-master cameras. The processor can then crop the video data image frames from the non-master cameras. The image data above the top epipolar line from each master camera and the image data below the bottom epipolar line for from each master camera can be cropped from the video data of the non-master cameras. The system can also crop the areas of the video data image frame outside the first bounding box of the first master camera video frame data and the video data image frame outside the second bounding box of the second master camera video frame data. In some embodiments, the initially cropped video data can be supplementally cropped. The uncropped video data can be further processed. When the processing of the frame of the video data completed, the described process can be repeated for the next subsequent frame of the video data from the cameras.

The bounding box AI engine can create a first bounding box around the object in the video data image frame from the first master camera and a second bounding box around the object in the video data image frame from the second master camera. The processor can then determine the locations of a first set of epipolar lines and a second set of epipolar lines on the video data image frames of the non-master cameras. The processor can then crop the video data image frames from the non-master cameras. The image data above the top epipolar line and the image data below the only bottom epipolar line for the first and second sets of epipolar lines can be cropped from the video data of the non-master cameras. The system can also crop the areas of the video data image frame outside the first bounding box of the first master camera video frame data and the video data image frame outside the second bounding box of the second master camera video frame data. The video data within the bounding boxes is processed. In some embodiments, the initially cropped video data can be supplementally cropped. When the processing of the frame of the video data completed, the described process can be repeated for the next subsequent frame of the video data from the cameras.

The use of epipolar line cropping of video data can substantially reduce the computational load on the system and can speed up the processing so that processing by the inventive system can be performed in real-time or near real-time. The processed object data can be used for numerous purposes. For example, an athlete's data can be used to analyze current performance and predict the performance capabilities of athletes.

The digital athlete data recorded over time can also be used to quantify performance improvements or degradation in performance. Cumulatively, the digital data can be used to predict the odds of sporting event outputs which can be useful in sports betting applications. The digital athlete data can be used to create hyper realistic animations that can allow visualization of the object movement in a virtual or augmented environment. The digital performance data can also be used to create very accurate virtual athlete performance models that can be used for sports simulations in video games, training, physical therapy, etc.

Figure 9:
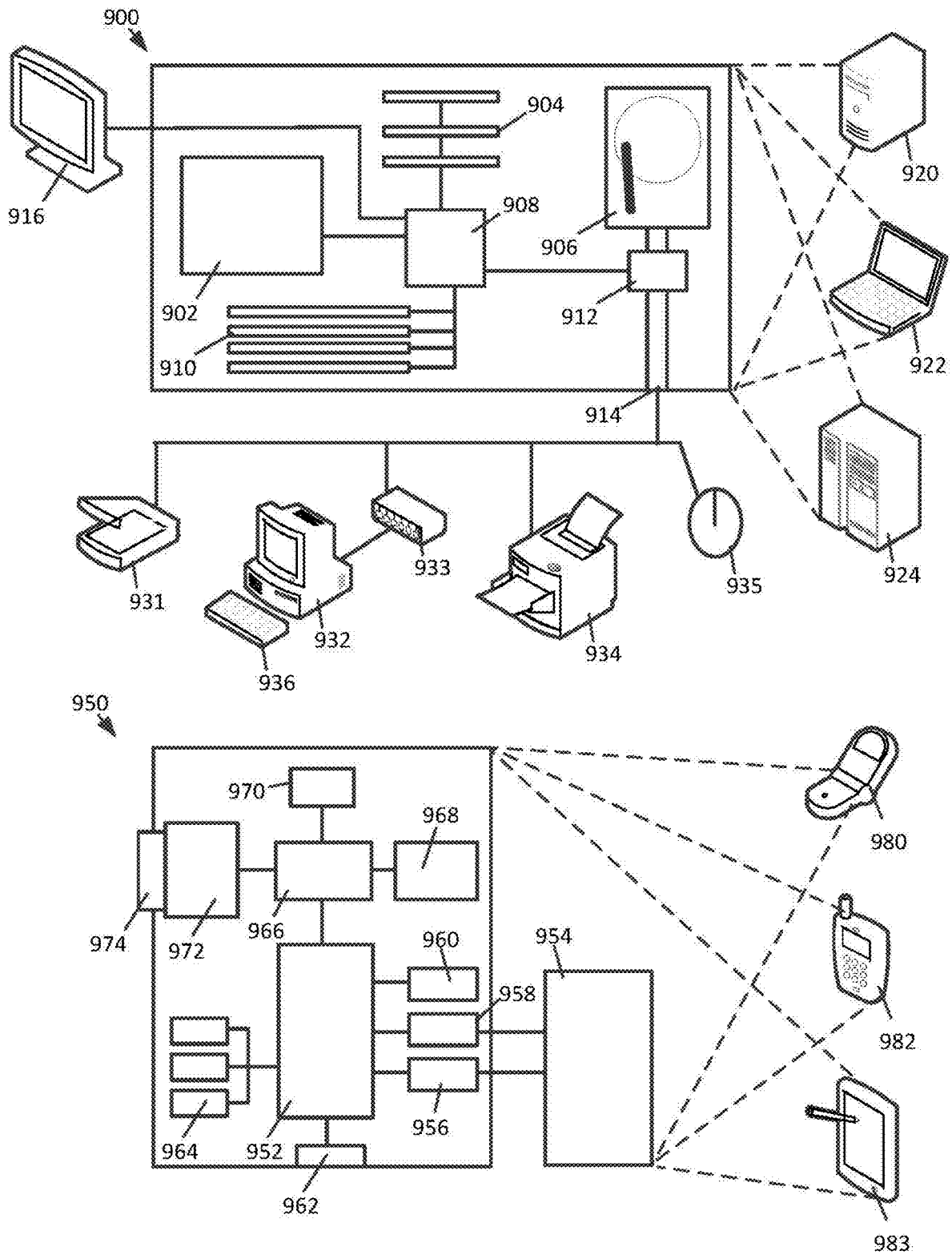
FIG. 9 illustrates a diagram of a computer system.

FIG. 9 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

What is claimed is:

1. A method for processing video data of an object in a movement space comprising:
   providing a plurality of cameras each facing the movement space;
   providing a processor in communication with each of the plurality of cameras which transmit video data of the movement space to the processor;
   determining by the processor, coordinates of a first bounding box that closely surrounds the object in a frame of the video data from a first camera of the plurality of cameras;
   determining by the processor, first epipolar lines in frame of the video data from a second camera of the plurality of cameras, the first epipolar lines corresponding to points on the first bounding box in the frame of the first camera; and
   processing by the processor, the video data in the frame of the second camera within two of the first epipolar lines and not processing the video data in the frame of the second camera outside the two of the first epipolar lines.

2. The method of claim 1 further comprising:
   cropping by the processor, the video data in the frame of the second camera above a highest epipolar line of the first epipolar lines and below a lowest epipolar line of the first epipolar lines.

3. The method of claim 1 further comprising:
   supplemental cropping by the processor, wherein feature detection is applied to further crop the video data in the frame of the second camera.

4. The method of claim 1 further comprising:
   determining by the object detection engine, coordinates of a second bounding box that closely surrounds the object in a frame of video data from a third camera of the plurality of cameras;
   determining by the processor, second epipolar lines in the frame of the second camera, the second epipolar lines corresponding to points on the second bounding box in the frame of the third camera; and
   cropping by the processor, the video data in frame of the second camera outside two of the second epipolar lines.

5. The method of claim 1 wherein the first bounding box has a rectangular shape and the first epipolar lines correspond to corners of the first bounding box.

6. The method of claim 1 further comprising:
   identifying by an AI-based key points engine running on the processor, locations of key points of the object in the frames of the first and second cameras.

7. The method of claim 1 further comprising:
   cropping by the processor, the video data in the frame of the second camera outside of a polygon formed by a highest epipolar line and a lowest epipolar line of the first epipolar lines that surrounds the first bounding box in the frame of the second camera.

8. The method of claim 7 further comprising:
   providing a pose engine running on the processor;
   determining by the pose engine the locations of the key points for the person in the frames from the first camera and the second camera; and
   determining by processor the 3D locations of the key points for the person in the 3D movement space from the locations of the key points for the person from the first camera and the second camera.

9. The method of claim 8 further comprising:
   determining by the pose engine, a confidence score for selected key points for each of the plurality of cameras; and
   determining by the processor, the first camera from the plurality of cameras based on the confidence scores for the selected key points for each of the plurality of cameras.

10. The method of claim 1 further comprising:
    determining by the processor, a new first camera from the plurality of cameras;
    determining by the object detection engine, new coordinates of a new first bounding box that closely surrounds the object in a new frame of the video data from the new first camera;
    determining by the processor, new epipolar lines in a new frame of a new second camera from the plurality of cameras, the new epipolar lines corresponding to points on the new first bounding box; and
    cropping by the processor, the video data in the new frame of the new second camera outside two of the new epipolar lines.

11. A method for processing video data of an object in a movement space comprising:
    providing a plurality of cameras each facing the movement space;
    providing an object detection engine running on a processor in communication with each of the plurality of cameras which transmit video data of the movement space to the processor;

determining by the object detection engine, a first camera from the plurality of cameras wherein the first camera has a highest confidence score;

determining by the object detection engine, coordinates of a first bounding box that closely surrounds the object in a frame of the video data from a first camera of the plurality of cameras;

determining by the processor, first epipolar lines in frame of the video data from a second camera of the plurality of cameras, the first epipolar lines corresponding to points on the first bounding box in the frame of the first camera; and cropping by the processor, the video data in the frame of the some of the plurality of cameras outside two of the first epipolar lines.

12. The method of claim 11 further comprising:

cropping by the processor, the video data in the frame of the second camera outside of a polygon formed by a highest epipolar line and a lowest epipolar line of the first epipolar lines that surrounds the first bounding box in the frame of the second camera.

13. The method of claim 11 further comprising:

supplemental cropping by the processor, wherein feature detection is applied to further crop the video data in the frame of the some of the plurality of cameras.

14. The method of claim 11 further comprising:

determining by the object detection engine, coordinates of a second bounding box that closely surrounds the object in a frame of video data from a second camera of the plurality of cameras;

determining by the processor, second epipolar lines in the frame of the some of the plurality of cameras, the second epipolar lines corresponding to points on the second bounding box in the frames of the some of the plurality of cameras; and cropping by the processor, the video data in frame of the some of the plurality of cameras outside two of the second epipolar lines.

15. The method of claim 11 wherein the first bounding box has a rectangular shape and the first epipolar lines correspond to corners of the first bounding box.

16. The method of claim 11 further comprising:

identifying by an AI-based key points engine running on the processor, locations of key points of the object in the frames of the first and second cameras.

17. The method of claim 11 further comprising:

identifying by the object detection engine, the object in the movement space as a person.

18. The method of claim 11 further comprising:

providing a pose engine running on the processor;

determining by the pose engine the locations of the key points for the person in the movement space obtained from the video data from the plurality of cameras; and determining by processor the 3D locations of the key points for the person in the 3D movement space locations of the key points for the person from the plurality of cameras.

19. The method of claim 11 further comprising:

determining by the pose engine, a confidence score for selected key points for each of the plurality of cameras; and determining by the processor, the first camera from the plurality of cameras based on the confidence scores for the selected key points for each of the plurality of cameras.

20. The method of claim 11 further comprising:

determining by the processor, a new first camera from the plurality of cameras;

determining by the object detection engine, new coordinates of a new first bounding box that closely surrounds the object in a new frame of the video data from the new first camera;

determining by the processor, new epipolar lines in new frames of the some of the plurality of cameras, the new epipolar lines corresponding to points on the new first bounding box; and cropping by the processor, the video data in the some of the plurality of cameras outside two of the new epipolar lines.

* * * * *